No. 852,932. PATENTED MAY 7, 1907.
J. H. CROSKEY.
CHARGING MECHANISM FOR GLASS MOLDS.
APPLICATION FILED MAY 31, 1906.
3 SHEETS—SHEET 1.
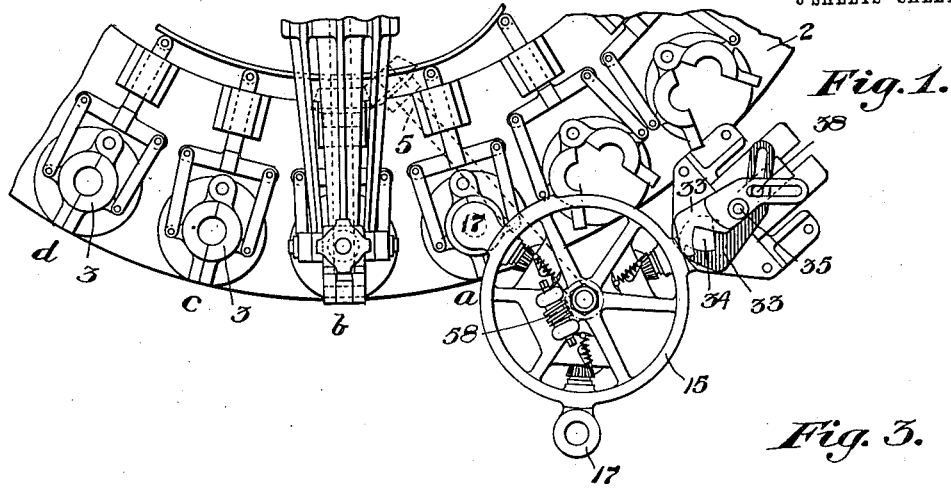
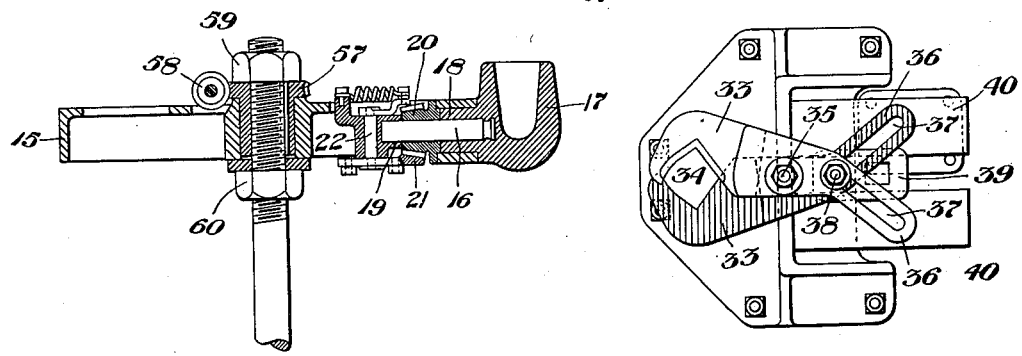
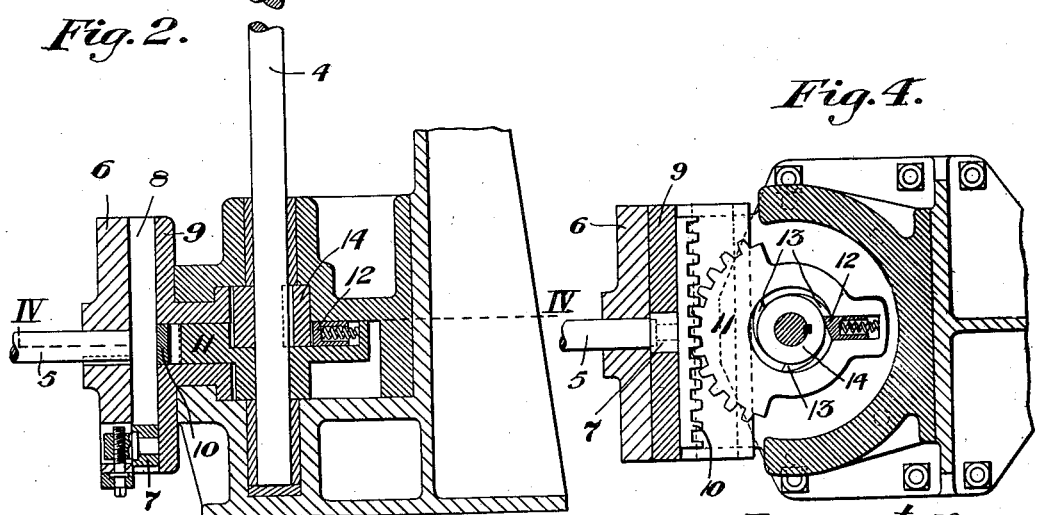
Witnesses:
E. R. Rodd.
Chas. S. Lepley.
Inventor:
John H. Croskey
by R. M. Clarke
his attorney.

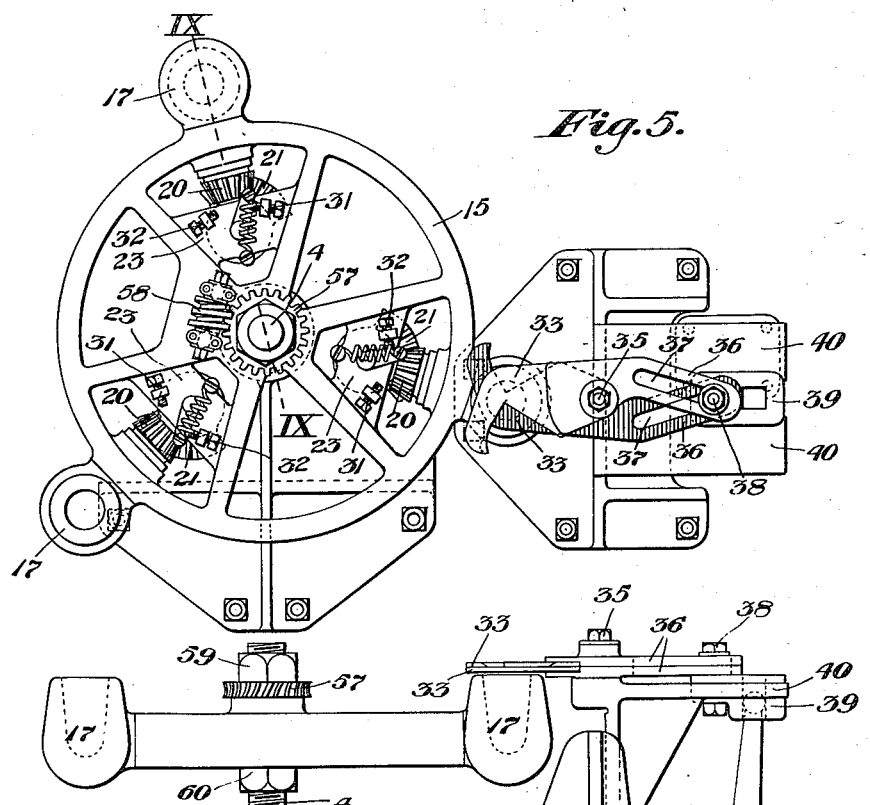
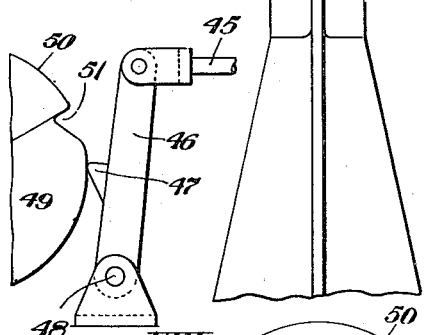
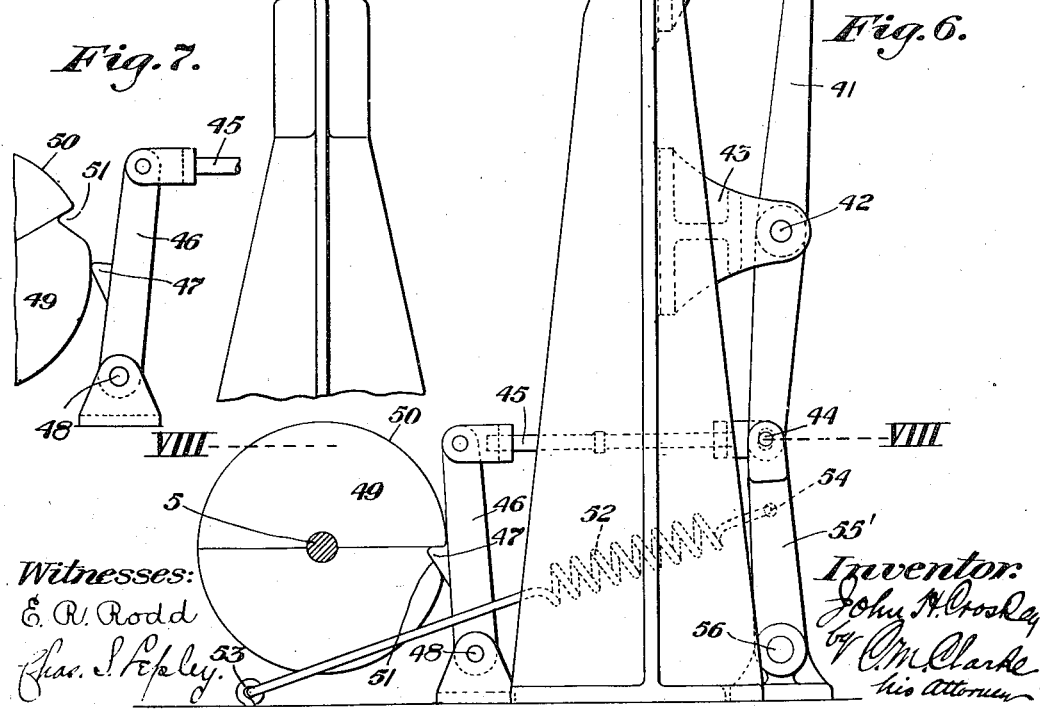

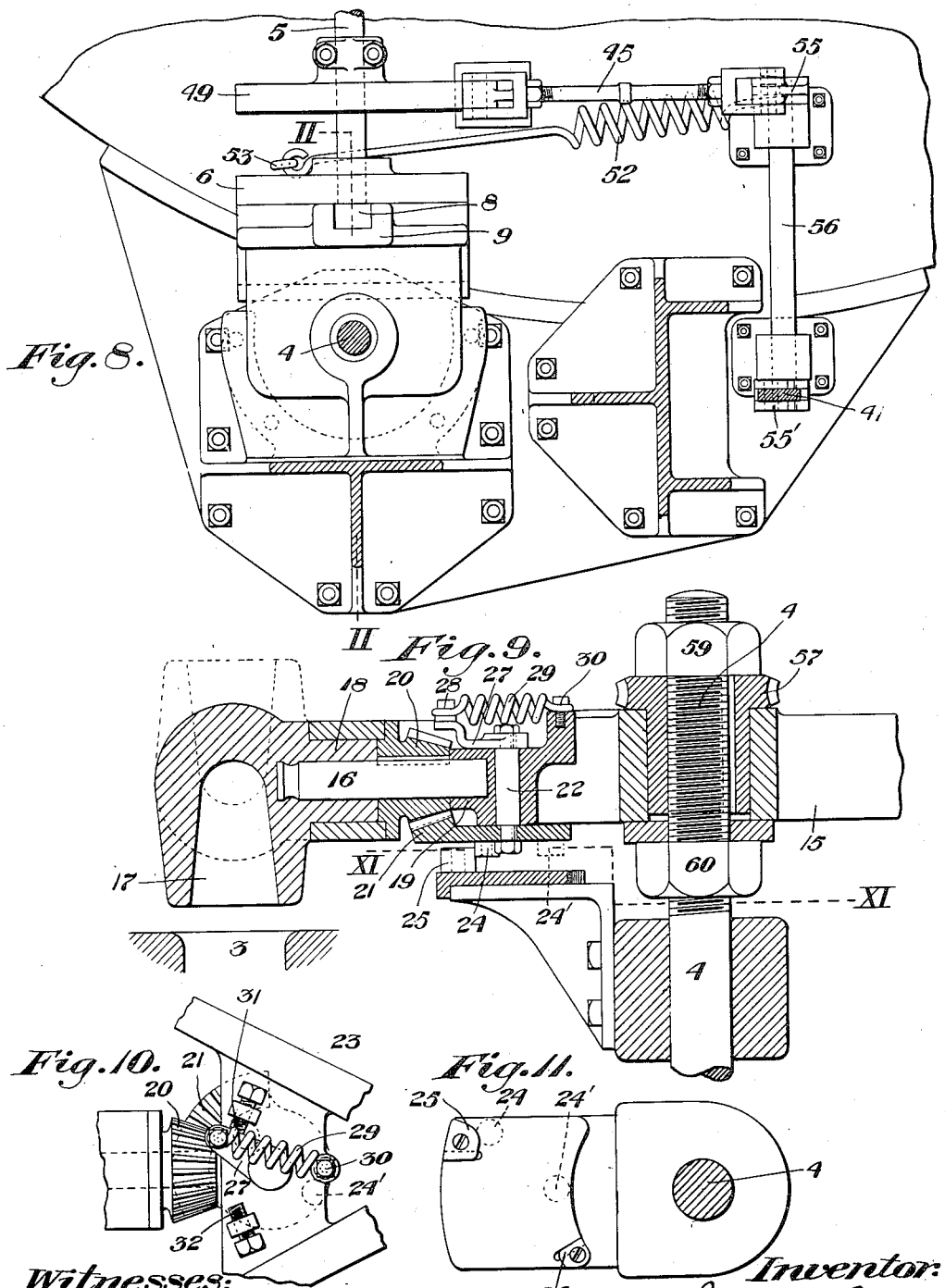

UNITED STATES PATENT OFFICE.

JOHN H. CROSKEY, OF PITTSBURG, PENNSYLVANIA, ASSIGNOR TO DUQUESNE GLASS CO., OF PITTSBURG, PENNSYLVANIA, A CORPORATION OF PENNSYLVANIA.

CHARGING MECHANISM FOR GLASS-MOLDS.

No. 852,932.     Specification of Letters Patent.     Patented May 7, 1907.

Application filed May 31, 1906. Serial No. 319,494.

*To all whom it may concern:*

Be it known that I, JOHN H. CROSKEY, a citizen of the United States, residing at Pittsburg, in the county of Allegheny and State of Pennsylvania, have invented certain new and useful Improvements in Charging Mechanism for Glass-Molds, of which the following is a specification, reference being had therein to the accompanying drawings.

My invention relates to the art of manufacturing glassware, particularly pressed ware, and it has for its object to provide means for filling a measured quantity of glass into a forming mold.

The invention is designed to operate in connection with one or a series of molds brought successively into register with the charging mechanism at a fixed point, but may be employed with any type of machine, the primary object being to control and limit the amount of glass so that the mold will receive approximately the same amount at each operation.

In carrying out my invention I employ a measuring cup adapted to receive in its interior a predetermined amount of molten glass which may be delivered to it in any suitable way as by an operator using a punty rod, or otherwise, together with shears for cutting off the glass or other quantity-determining device, and mechanism for bringing or locating the measuring cup over the mold and for reversing it to discharge thereinto, as shall be more fully hereinafter set forth.

Referring now to the drawings:—Figure 1. is a plan view showing a portion of a rotating mold-carrying table and molds thereon, with each of which molds my invention is adapted to co-operate. Fig. 2. is a vertical sectional view on an enlarged scale on the line II. II. of Fig. 8, showing the rotating cup-carrying mechanism and the means for intermittently actuating it. Fig. 3. is a plan view on an enlarged scale of the shear mechanism. Fig. 4. is a horizontal sectional view on the line IV. IV. of Fig. 2. Fig. 5. is an enlarged plan view of the mechanism illustrated in Fig. 1. Fig. 6. is a view in side elevation of Fig. 5. Fig. 7. is a detail view illustrating the cam mechanism for actuating the shears, during their inactive period. Fig. 8. is a horizontal sectional view on the line VIII. VIII. of Fig. 6. Fig. 9. is an enlarged detail sectional view on the line IX. IX. of Fig. 5. Fig. 10. is a detail plan view of the mechanism for turning the cup. Fig. 11. is a horizontal sectional view on the line XI. XI. of Fig. 9.

I have illustrated my invention as used in combination with that type of glass pressing machinery shown in my prior patent No. 820,478 dated May 15th, 1906 wherein an intermittently rotating table 2 provided with a circumferential series of molds 3 is constructed and arranged to bring each mold successively into stationary registering position with a pressing plunger, and at the same time into charging position for filling the mold.

My present invention as shown employs an intermittently rotating frame adapted or arranged to co-operate as to its motions with the motions of said table and molds, and comprises a central supporting spindle shaft 4 adapted to be intermittently rotated. As shown, I actuate the spindle 4 by means of a shaft 5 geared in any suitable manner with the driving mechanism of the table 2, so that it will rotate the spindle 4 any predetermined distance, as say one-third of a revolution for each corresponding intermittent travel of the molds 3 from one position to another, as from *a* to *b*, *b* to *c*, *c* to *d*, etc.

Any convenient or suitable means may be employed to impart motion intermittently to shaft 4, and in Figs. 2, 4 and 8 I have shown said shaft 5 (rotated in conformity with the mold travel) as provided with a crank disk 6 carrying a crank pin or roller 7 engaging a slot 8 of a reciprocating head 9. Said head 9 is provided with a rack 10 which gears into a segment 11 loosely mounted on shaft 4 and provided with a pawl 12 adapted to engage teeth 13 of a ratchet wheel 14 in engagement with shaft 4, as clearly shown. By this construction it will be seen that for each rotation of shaft 5, spindle 4 will be rotated the desired distance, as one-third of a revolution, corresponding to the desired distance of travel of the cup from the filling position in register with the shears to the emptying position in register with the mold, as clearly indicated in Fig. 1.

It will be readily understood that the cup may be maintained relatively stationary as to lateral swinging travel, and may be turned over to empty into the mold while still in register with the shears underneath, the shears, cup and mold being in vertical alinement, using one cup only. Also that a series of cups may be employed, but arranged to deliver directly into the mold while still underneath the shears, as it is not absolutely necessary that the cup shall swing laterally away from its receiving position under the shears before emptying into the mold, and such arrangement may be found preferable with other constructions of forming apparatus than that shown in the drawings.

On the upper end of shaft 4 is mounted a frame 15 which may be in the form of a wheel as shown or any other desired construction, in which are carried any preferred number of cup-supporting and rotating arms or shafts 16 having at their outer ends cups 17 adapted to receive and contain the desired quantity of molten glass. The shafts 16, or the hubs 18 of the cups, are journaled for rotation in the outer portion of the frame 15, their inner ends being also preferably journaled in any suitable bearing as a lug 19 forming a portion of the bearing for the shifting mechanism. Each shaft 16 is provided with a bevel pinion 20 adapted to mesh into the teeth of a segmental rack 21 secured underneath the frame 15 upon the lower end of an actuating stud 22 having its bearing in the cross bar 23 extending between the adjacent arms of the wheel frame 15.

Upon the lower face of the segmental rack 21 are secured rollers or abutments 24, 24', adapted to make contact alternately with stationary abutments 25, 26, as the frame is swung around by the shaft 4. The upper end of stud 22 is provided with a lever arm 27, the terminal 28 of which is connected by spring 29 at a point 30 with a securing device as a bolt, located somewhat back of the center of stud 22. The location of the spring connections is such that the spring will exert pressure to one side or the other so as to throw the rack segment to the right or the left, thus positively assisting the initial movement imparted to the segment by means of the contact of rollers 24, 24' with abutments 25 and 26.

Stops 31 and 32, in the form of adjustable set screws, are located at each side respectively in the path of lever 27 whereby its travel in one direction or the other may be arrested, and the gearing is so designed that the complete swing or movement of the segment 21 will impart a semi-rotation to shaft 16 and cup 17. It will thus be seen that when the cup in its raised position full of glass is swung around by rotation of shaft 4 over the mold as shown in Fig. 1, abutment 24 will come into contact with stationary abutment 25, arresting abutment 24 and causing rack 21 to shift around until lever 27 is past the dead center of alinement with spring 29, whereupon the spring will complete its travel, throwing abutment 24 clear of abutment 25. In this position the frame 15 is stationary, during which time the glass is discharged from the cup 17 into mold 3, whereupon rotary motion is then imparted to frame 15 to bring the next cup into register. The previously emptied cup is however rotated back to the initial upright position as shown in dotted lines in Fig. 9, by means of abutment 24' coming into contact with abutment 26, whereby with the assistance of spring 29, the operation in reverse of that just described is performed, and the cup is turned up in position for receiving the next charge. The glass is charged into the upright cup at the time it is in register below the shears in their open position, Fig. 3, by the operator, and during the stationary period of all the cups.

The shears comprise two blades 33, 33, having suitable openings 34, pivoted at 35 and provided with backwardly extending arms 36, 36, having slots 37, 37. The shears are actuated by means of a reciprocating pin 38 extending upwardly from a sliding carrier 39 mounted in slide extensions 40 of the frame, said carrier being actuated by lever 41 which engages it at its upper end. Lever 41 is pivoted at 42 in bearing 43, extends below said bearing, and is connected at 44 with one end of a pitman 45, attached at the other end to a cam actuated bar 46. Said bar is provided with a lug 47 and is pivoted at 48 in a suitable standard. 49 is a cam wheel having a uniform peripheral edge 50 interrupted at one point in its circumference by a shouldered recess 51 adapted to provide clearance for lug 47 to actuate the shears. 52 is a spring secured at one end at 53 and at the other at 54 to an arm 55 secured on one end of rock shaft 56 carrying lever 55' at its other end, said lever being connected with the lower end of lever 41 and end of pitman 45. The double lever construction is convenient for construction but is not absolutely essential to the operation and may be dispensed with, the spring being connected directly with the pivotal joint 44 or in any other suitable way, or in fact any other spring mechanism may be employed to throw arm 46 toward cam 49.

Ordinarily arm 46 is held in the position shown in Fig. 7, maintaining the upper end of lever 41 in its innermost position, (see Fig. 3,) and holding the shears open to permit of the glass being charged into the cup, but at the proper moment cam cavity 51, coming into register with lug 47 permits the spring to act, throwing pin 38 outwardly and effecting the quick closing action of the shears. As shown in Fig. 8 cam 49 is mounted on shaft 5 of the machine whereby the operation of the shears will occur at each peripheral rotation of shaft 4.

For the purpose of accurately adjusting frame 15 and the cups so that they will exactly register with the shears and each mold successively, I have provided means whereby the frame may be adjustably set around the upper terminal of shaft 4, consisting in a worm wheel 57 the hub of which is keyed to shaft 4 and is loosely mounted within the surrounding hub of the cup wheel 15.

58 is a worm meshing into worm wheel 57 and capable of being turned in one direction or the other so as to set the frame 15 accurately to the desired position. After being set the entire mechanism may be tightly clamped together by means of nuts 59 and 60.

The operation is as follows:—As each cup is brought successively into register with the open shears, a ball of glass is dropped downwardly just before the shears are operated, by which shear action the desired quantity is cut off, filling the cup, which then swings around to the position over the mold, is reversed, discharging its contents thereinto, then being re-reversed and traveling around to the inoperative intermediate position. The operation is continuous and automatic, results in great accuracy of action and quantity of glass, giving a uniform size of product without shortage or excess, and in practice has effected and facilitated the production of a very high percentage of perfect finished articles.

It will be understood that a single cup or any other number than three may be employed if desired, the essential requisites being that the cup shall be brought under the shears in its upright position and then brought over the mold and reversed to empty, or merely turned over to empty into the mold without swinging, by suitable actuating mechanism.

Any other means may be employed to effect this result within the province of the designing engineer or builder, or other changes or variations may be made by the skilled mechanic in the different details or other features of construction, but all such changes are to be considered as within the scope of the following claims.

What I claim is:

1. The combination with a forming mold, of a measuring cup, opening and closing shear mechanism located closely adjacent above the cup, and means for turning and moving the cup into registering position with the mold, substantially as set forth.

2. The combination with opening and closing shear mechanism and a forming mold, of a rotating frame, a rotatable measuring cup carried in the frame, means for intermittently actuating the frame to position the cup with relation to the shear mechanism and mold respectively, and for tipping the cup to empty its contents into the mold.

3. The combination with opening and closing shear mechanism and a forming mold, of a measuring cup arranged to register with the shear mechanism in upright position and to turn over in registering position with a mold to empty thereinto, substantially as set forth.

4. In apparatus for filling the molds, the combination with opening and closing shear mechanism, of a cup-carrying frame provided with a rotatable shaft carrying the cup, means for swinging the frame to bring the cup into registering position with the mold, and means for imparting a semi-rotation to the cup carrying shaft, substantially as set forth.

5. In apparatus for filling the molds, the combination with opening and closing shear mechanism, of a cup-carrying frame provided with a rotatable shaft carrying the cup, means for swinging the frame to bring the cup into registering position with the mold, means for imparting a semi-rotation to the cup carrying shaft, and means for re-rotating the shaft and cup, substantially as set forth.

6. In apparatus for charging the molds, the combination with opening and closing shear mechanism, of a rotatable framework provided with a plurality of rotatable measuring cups, means for bringing each cup into registering position with the shears and then into registering position with the mold, with means for reversing the cups to empty into the molds, substantially as set forth.

7. Mechanism for tipping the cup consisting of a carrying shaft having a toothed wheel, a toothed plate engaging the wheel and having abutments, and stationary abutments located in the path of said abutments, substantially as set forth.

8. Mechanism for tipping the cup consisting of a carrying shaft having a toothed wheel, a toothed plate engaging the wheel and having abutments, and stationary abutments located in the path of said abutments, and spring mechanism for facilitating the operation, substantially as set forth.

9. Tilting mechanism consisting of a shaft, a cup secured thereto, a pinion gear secured on the shaft, a segmental rack adapted to mesh into said pinion and provided with abutments, stationary abutments adapted to engage said abutments, a pivotal stem for the segmental rack provided with a crank arm, and a spring connected with said crank arm, substantially as set forth.

10. The combination with a frame provided with stationary abutments, of a uniformly horizontally swinging frame carrying a tilting cup, a toothed gear for said cup, and a pivoted toothed gear plate adapted to rotate the cup provided with abutments adapted to make contact with said stationary abutments to rotate the cup to deliver its contents downwardly into a mold, substantially as set forth.

11. The combination with a frame provided with stationary abutments, of a uniformly horizontally swinging frame carrying a tilting cup, a toothed gear for said cup, and a pivoted toothed gear plate adapted to rotate the cup provided with abutments adapted to make contact with said stationary abutments to rotate the cup to deliver its contents downwardly into a mold, and spring-controlled mechanism for facilitating the tilting operation, substantially as set forth.

12. The combination with a mold carrying table and molds thereon, of opening and closing shear mechanism, a solid cup adapted to contain a measured quantity of glass, means for rotating and bringing the cup into emptying position over a mold, and means for actuating the mold table and cup manipulating means in harmony.

13. The combination with a mold-carrying table and molds thereon, of opening and closing shear mechanism, a measuring cup, means for rotating and bringing the cup into register with the shear mechanism and into emptying position over a mold respectively, and means for actuating the shear mechanism, the mold table, and the cup manipulating means in harmony, substantially as set forth.

14. The combination with a mold-carrying table and molds thereon, of opening and closing shear mechanism, a cup carrying frame provided with a plurality of tipping cups, means for actuating the frame to bring the cups successively into register with the shear mechanism and molds respectively, means for actuating the shear mechanism, and means for actuating the table, all of said means being operatively connected to operate in harmony, substantially as set forth.

15. The combination with the cup-carrying frame and cups carried thereby, of a vertical supporting shaft provided with a ratchet wheel, a toothed segment having a pawl, a slotted sliding head having a rack meshing into said segment, and an actuating crank engaging said slotted sliding head, substantially as set forth.

16. The combination with a continuously running shaft provided with a crank and pin, of an intermittently actuated vertical shaft provided with a cup-carrying frame and a plurality of cups, a ratchet wheel secured to said shaft, a toothed segment provided with a pawl engaging the ratchet wheel, and a reciprocating sliding head having a rack engaging the segment and provided with a slot engaging the crank pin, substantially as set forth.

17. In mechanism of the class described, the combination with a vertical intermittently actuated bearing shaft provided with a fixedly attached worm wheel, of a cup-carrying frame mounted on the shaft provided with a plurality of cups, and a worm mounted upon said wheel and in engagement with said worm wheel for adjustment of the cup-carrying frame with relation thereto, supstantially as set forth.

18. The combination with a series of measuring cups and acutating mechanism therefor, of shears having slotted actuating arms, a lever provided with a sliding pin engaging said arms, a cam, lever mechanism engaging the same and connected with said first named lever, and a retracting spring, substantially as set forth.

19. The combination with a series of measuring cups and actuating mechanism therefor, of shears having slotted actuating arms, a lever provided with a sliding pin engaging said arms, a cam, a rock shaft provided at one end with a lever, a connecting pitman and a secondary lever engaging the cam and also a retracting spring, and at the other end with a lever connected with the end of the shear operating lever, substantially as set forth.

In testimony whereof I affix my signature in presence of two witnesses.

JOHN H. CROSKEY.

Witnesses:
CHAS. S. LEPLEY,
C. M. CLARKE.